United States Patent [19]

Johansson

[11] 4,208,228
[45] Jun. 17, 1980

[54] METHOD OF MAKING BUILDING PANEL STRUCTURE

[76] Inventor: Lennart Johansson, Torildsgatan 10, 55258 Jönköping, Sweden

[21] Appl. No.: 922,966

[22] Filed: Jul. 10, 1978

[51] Int. Cl.² .................................................. B32B 31/00
[52] U.S. Cl. ...................................... 156/84; 156/242; 156/243; 156/246; 156/276; 156/278; 156/280; 156/289
[58] Field of Search ............... 156/242, 246, 247, 276, 156/278, 279, 280, 289, 62.2, 84, 243

[56] References Cited

U.S. PATENT DOCUMENTS

| | | | |
|---|---|---|---|
| 3,511,731 | 5/1970 | Raynal | 156/246 |
| 3,615,963 | 10/1971 | Johansson et al. | 156/62.2 |
| 3,639,202 | 2/1972 | Simon | 156/243 |
| 3,843,486 | 10/1974 | Johansson et al. | 156/280 |

*Primary Examiner*—Caleb Weston
*Attorney, Agent, or Firm*—Criddle & Western

[57] ABSTRACT

An improved method is disclosed for manufacturing composite panels of sandwich-types, with each composite panel including an outer layer formed from a mixture of solid particles and a resinous binder and a structural inner layer or core element which penetrates and is bonded to the outer resinous layer. The improved method achieves more accurate and consistent spacing of the outer layer relative to the inner core element by providing means for accurately and consistently controlling the degree of penetration of the outer layer by the inner core element. This is done by spreading a first layer of the mixture of solid particles and liquid resinous binder on a mold base. A sheet of material which is permeable to the mixture of particles and resinous binder is applied to the surface of the first layer, and the resinous binder in the first layer is allowed to gel. A second layer of the mixture of solid particles and liquid resinous binder is spread over the gelled first layer and the sheet of material which is positioned substantially at the surface of the first layer. One side of the inner core element of the composite panel is then applied to the second layer of the mixture of solid particles and liquid binder so as to penetrate such second layer sufficiently that the contacting side of the core element is positioned adjacent to the sheet of material at the surface of the gelled first layer. Both the first and second layers are then cured to a hardened, rigid, solid state.

12 Claims, 6 Drawing Figures

METHOD OF MAKING BUILDING PANEL STRUCTURE

BACKGROUND OF THE INVENTION

1. Field

The invention pertains to manufacturing of composite, sandwich-type panels comprising an outer layer of resinous binder and an inner core element or structural layer which is bonded to the outer layer. Such panels are useful in making walls, partitions, roofs, ceilings, floors, wall paneling, doors, signs, etc. In particular, the invention is directed to an improved method of making such composite panels.

2. State of the Art

Composite, sandwich-type panels have been produced having various type cores laminated to dense materials such as asbestos cement board, porcelained or enameled steel, aluminum, tempered glass, plywood, and perlite board. Generally, such sandwich constructions have been made by gluing sheets or panels of the external material to the broad, flat surfaces of preformed core elements.

It is also known to manufacture a composite, sandwich-type panel comprising an outer layer formed of a mixture of solid particles and a resinous binder, and a structural inner layer or core element which penetrates and is bonded to the outer resinous layer. In making such panels, a layer of a mixture of solid particles and a liquid resinous binder is spread on a mold base, and one side of the structural layer or core element is applied to the surface of the layer so as to penetrate the layer. The liquid binder in the layer is then cured to its hardened, rigid, solid state, thereby securely bonding structural layer or core element to the layer of cured resinous material. Such a process is described in U.S. Pat. No. 3,615,963.

It has been found difficult, however, when making the sandwich-type panels of U.S. Pat. No. 3,615,963, to maintain uniform penetration of the layer of particles and liquid resinous binder by the structural core element. This causes problems when the core element penetrates too deeply and disrupts the surface or otherwise mars the finish on the external surface of the panel. Further, it is very difficult to maintain a uniform thickness within a single panel as well as from one panel to another due to the varying depths that the structural core element penetrates into the layer of resinous material. Moreover, the strength of the bond between the outer layer and the structural core element will vary with the depth to which the core penetrates the layer of resinous material. It was proposed in U.S. Pat. No. 3,843,486 to alleviate the penetration problem by incorporating a support member in the form of a sheet material within the layer of the mixture of solid particles and liquid resinous binder. The support member was intended to regulate the depth to which the structural layer or core penetrates the layer of liquid resinous material. The process of U.S. Pat. No. 3,843,486 results in some improvement in the quality of the composite panels which are produced; however, experience has shown that it is still difficult to maintain uniform placement of the sheet of support material within the liquid layer of resinous material. For example, the sheet is often displaced from its intended position by the structural layer or core element during the manufacturing of the composite panel, which again results in nonuniformity in the thickness of the panels which are produced.

3. Objectives

The principal objective of the present invention is to provide an improved process for manufacturing composite panels such as those disclosed in U.S. Pat. Nos. 3,615,963 and 3,843,486, wherein substantial uniformity of thickness is obtained within each panel as well as from panel to panel, and wherein surface defects in the panels due to excessive penetration of the layer of resinous material which forms the exterior surface of the panel are essentially eliminated. Additional objectives are to provide a process with improved means for spreading the layer of resinous material on the mold base, and to provide improved steps for curing the resinous material and facilitating separation of the cured composite panel from the mold base.

SUMMARY OF THE INVENTION

The above objectives are achieved in accordance with the present invention by a combination of process steps including spreading a first layer of a resinous mixture on a polished, mold base. The resinous mixture, as the term is used throughout the specification and claims, comprises a mixture of solid particles and a liquid resinous binder. A sheet member is applied to the surface of the first layer. The sheet member is made of a material which can be permeated by the resinous mixture. The term "permeated" as used throughout the specification and claims is intended to encompass the absorption of resinous mixture by an absorbant material used as the sheet member, as well as the diffusion of resinous mixture into the pores or interstices of an absorbant or nonabsorbant material used as the sheet member.

The resinous binder in the first layer is then allowed to gel, and a second layer of the resinous mixture is spread over the gelled first layer and the sheet of material which is positioned substantially at the surface of the first layer. One side of a core element comprising a structural layer of a material which can be permeated by the resinous mixture is applied to the surface of the second layer of resinous mixture. The core element is urged into contact with the second layer with sufficient force that the one side thereof penetrates the depth of the second layer to a position substantially adjacent to the sheet of material at the surface of the gelled first layer. The first and second layers are then cured to a hardened, rigid, solid state.

In a preferred embodiment of the process, the spreading of the first and second layers of resinous mixture is accomplished using a vibrating doctor blade which extends across the width of the mold base in spaced, substantially, parallel relationship thereto. The doctor blade traverses the length of the mold base and spreads the resinous mixture in substantially smooth, even layers which are essentially free of entrained air pockets.

The curing of the layers of resinous mixture is advantageously hastened by applying heat to the composite panel structure. In addition to facilitating curing of the composite panels, the application of heat induces shrinkage of the first and second layers of resinous mixture as they cure. The mold base expands slightly as it is heated, and the skrinkage of the resinous mixture as it cures facilitates separation of the cured, composite panel from the mold base. Uniform cooling of the mold base and cured, composite panel following the curing step further induces differential shrinkage between the panel and the mold base, which further facilitates separating the cured panel from the mold base.

Composite panels can be made having hardened layers of resinous material on each of the opposite, flat sides thereof by applying a second mold base, having two layers of the resinous mixture and a sheet of material interposed between the two layers, to the other side of the core element in a manner similar to the application of the first mold base to the first side of the core element mold base. In preparing the second mold base for such application, an initial layer of the resinous mixture is applied to the polished surface thereof. For purposes of clarity, the initial layer of mixture on the second mold base is hereinafter referred to as the third layer of such material to differentiate it from the first and second layers of material on the first mold base. A sheet of material which can be permeated by the resinous mixture is applied to the surface of the third layer on the second mold base. This sheet of material will hereinafter be referred to as the second sheet to differentiate it from the first sheet of material used with the first mold base. The resinous binder in the third layer is then allowed to gel and a subsequent layer, hereinafter referred to as the fourth layer, of resinous mixture is applied over the gelled third layer and associated second sheet of material which is positioned substantially at the surface of the third layer. The second mold base is then positioned so that the fourth layer contacts the other, mutually opposite, flat side of the core element, i.e., the side of the core element which extends from the first mold base. The fourth layer of resinous mixture on the second mold base is urged into contact with the other side of the core element with sufficient force that the other side of the core element penetrates the depth of the fourth layer to a position substantially adjacent to the second sheet of material at the surface of the gelled first layer. The third and fourth layers are then cured to a hardened, rigid, solid state.

When making the composite panels having hardened layers of smooth resinous material on each of the opposite flat sides thereof, the layers of resinous material on the first mold base, with the core element positioned in contact therewith, can be assembled and cured prior to the positioning of the second mold base and its associated layers of resinous material in contact with the other side of the core element. Preferably, however, the layers of resinous material are prepared on the second mold base substantially simultaneously with the preparation of the first mold base, and the second mold base is positioned with the fourth layer of resinous mixture in contact with the other side of the core element prior to the curing of the layers of resinous mixture on either of the mold bases, and the layers of resinous mixture on both the first and second molds are then cured simultaneously.

Other features and advantages of the invention will become apparent from the following detailed description, taken together with the accompanying drawings.

THE DRAWINGS

DETAILED DESCRIPTION OF THE ILLUSTRATED EMBODIMENTS

The production of composite panels in accordance with the present invention is described hereinafter with reference to the drawings. Throughout the drawings, like parts of the system used in preparing the panels are designated by the same numerals.

A mold base 10 is prepared from an appropriate flat member made of a material which has a glass-like surface or which can be polished to form a glass-like surface thereon. Advantageously, the mold base 10 can be made of a flat sheet or panel of glass which has been glued to a metallic frame, with one of the broad, flat surfaces of the glass panel being polished and exposed as the face of the mold base 10. Preferably, the glass panel is glued to the metallic frame using a silicone rubber adhesive or other like adhesive which is adapted to yield to the differential in expansion and contraction of the glass panel and the metal frame during heating and cooling steps which are employed in manufacturing the composite panels of this invention.

Figure 1:
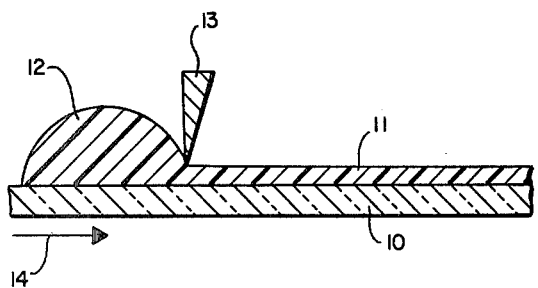
FIG. 1 is a diagramatic, cross-sectional representation of a system in accordance with the invention being used in applying the first layer of the resinous mixture to the mold base or to the color coat in those instances where a color coat is being used.

The exposed surface of the mold base 10 is treated with a release agent as is commonly done in molding and casting processes which are well known in the art. A first layer 11 of a mixture of solid particles and liquid resinous binder is then spread uniformly on the polished surface of the mold base 10. As illustrated in FIG. 1, a reservoir 12 of the resinous mixture is maintained on the upstream side of a doctor blade 13 which extends across the width of the mold base 10 in spaced, substantially parallel relationship thereto. The doctor blade 13 is adapted to traverse the length of the mold base 10 by either having the doctor blade 13 move along the length of the mold base 10, or, preferably, by moving the mold base 10 relative to the doctor blade 13 in the direction indicated by the arrow 14 in the drawings. A pigment can be included in the resinous mixture which is formed into layer 11 on the mold base to give a desired color to what will be the finished side of the composite panel when the completed panel is removed from the mold base 10. Alternatively, a relatively thin coating of colored resinous material, such as the resinous binder used in the resinous mixture of layer 11 or a polyester base paint, can be initially applied to the mold base 10, with the layer 11 of resinous material, which need not contain a pigment or other coloring material, being applied over the color coat. It has been found preferable, when a thin initial color coat is being used, to cure the color coat prior to applying the layer 11 thereto, thereby eliminating any problem of disruption or otherwise harming the thin color coat as the layer 11 is being applied.

Figure 2:
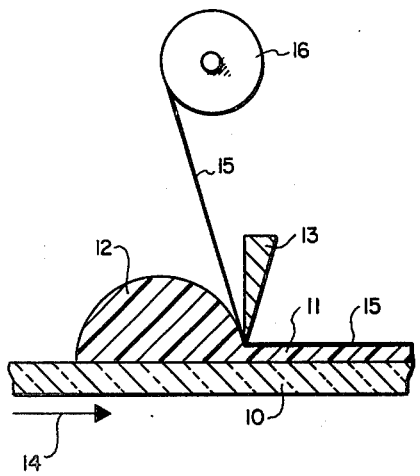
FIG. 2 is a diagramatic, cross-sectional representation of a system similar to that of FIG. 1, showing the application of the first layer of resinous mixture to the mold base, with concurrent application of the sheet of material to the upper surface of the first layer.

A sheet of material 15, which can be permeated by the resinous mixture, is applied on the surface of the layer 11. This can be done by applying the sheet of material 15 to the exposed surface of layer 11 subsequent to the formation of layer 11 on the mold base 10. Preferably, as illustrated in FIG. 2, the sheet of material is applied to the layer 11 simultaneously as the layer 11 is being formed. This is done by feeding the sheet material 15 from a supply reel 16 between the supply 12 and the doctor blade 13 in a manner that the sheet material 15 lies substantially along the exposed surface of the first layer 11. In those instances wherein a dimensionally weak sheet material such as a nonwoven mat is being used, it may be necessary to lay the sheet material on the layer 11 rather than feeding the sheet of material between the doctor blade 13 and the supply 12 as layer 11 is being formed.

Figure 3:
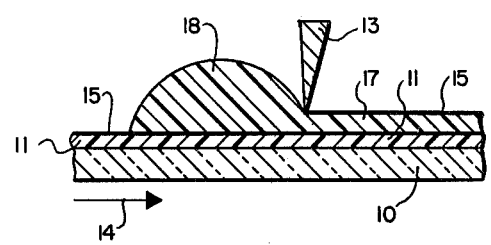
FIG. 3 is a diagramatic, cross-sectional, representation of a system similar to that of FIG. 1, showing the application of the second layer of resinous mixture over the first layer and the sheet of material positioned substantially at the surface of the first layer.

The resinous binder in the layer 11 is allowed to gel, and a second layer 17 of resinous mixture is applied over the gelled layer 11 and the sheet of material 15 which is positioned substantially at the surface of layer 11. As illustrated in FIG. 3, the doctor blade 13 is adjusted to a height above the layer 11 equal to the desired thickness of the second layer 17, and a reservoir 18 of the resinous mixture is maintained on the upstream side of the doctor blade 13 which traverses the length of the mold base 10 in a similar manner as in the application of the first layer 11.

Before any significant gelling of the second layer 17 of resinous material occurs, a core element 19 is applied to the layer 17. Sufficient force is applied to the core element 19 as it is applied to layer 17 whereby one side of the core element penetrates substantially the depth of the layer 17, so that the one side of the core element 19 is substantially adjacent to the sheet of material 15 at the surface of the first layer 11.

Figure 6:
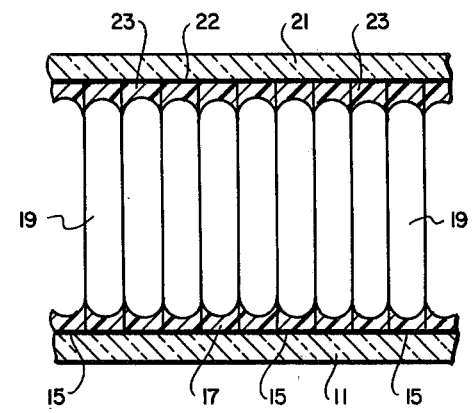
FIG. 6 is a cross-sectional view through a part of a composite panel wherein the layers of resinous material have been applied to both sides of the core element.
Figure 4:
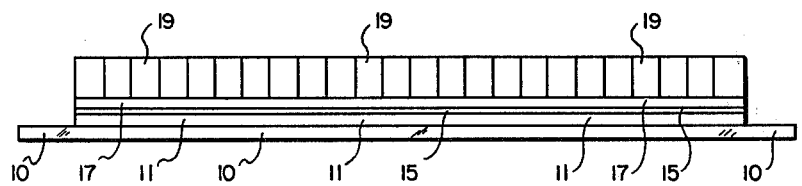
FIG. 4 is a diagramatic representation showing the application of the core element to the previously prepared layers of resinous material on the mold base.

The core element 19 comprises a structural layer of material which can be permeated by the resinous mixture. It may consist of a material which is capable of absorbing the liquid resinous binder in the layer 17, or it may consist of a material which wicks up the resinous mixture in the open cells and interstices thereof with or without absorbing the resinous binder of the resinous mixture, as illustrated in FIG. 6. Examples of suitable materials from which the core element can be made include corrugated board and so called honeycomb board, perlite board, and similar material having a cellular structure.

The first and second layers 11 and 17, respectively, of the resinous mixture can now be cured by applying heat evenly to the mold base 10, and the uncured panel thereon. If a composite panel is desired having a resinous layer applied to only one side of the core element 19, the layers 11 and 17 are cured and the cured panel and mold base are cooled, whereupon the panel is then separated from the mold base 10. As has been mentioned hereinbefore and will be further discussed hereinafter, the heating and cooling of the panel and mold base 10 effect a differential shrinkage between the mold base 10 and the layers 11 and 17 of resinous material, thus facilitating separation of the composite panel from the mold base 10.

For purposes of the present discussion, it is assumed that a composite panel having layers of resinous material on both sides of the core element 19 is desired. In such circumstances, the layers 11 and 17 are applied to the mold base 10, and the core element is applied to the second layer 17 as has been described above. The curing of the layers 11 and 17 can be, but need not be, done prior to the subsequent steps for applying resinous materials to the other side of the core element 19 as will be described below. Preferably, the curing of layers 11 and 17 is delayed until the layers of resinous material have been provided on the other side of the core element, whereupon curing of all the layers is accomplished concurrently as will be explained below.

Either simultaneously with or subsequent to the preparation of the first mold base 10 as described above, a second mold base 20 (see FIG. 5) is prepared in accordance with the following procedure. A third layer 21 of resinous mixture is spread on the polished surface of the second mold base 20. A release agent is preferably applied to the polished surface of the mold base 20 prior to the application of the layer 21 thereto. The application of the layer 21 on mold base 20 is accomplished using a doctor blade in the same manner as described above with reference to applying layer 11 to the first mold base 10.

A second sheet of material 22 is applied to the surface of the layer 21 on mold base 20. This sheet is applied to layer 21 in the same manner as described hereinbefore for applying sheet 15 to the first layer 11 on the first mold base 10. The binder in the third layer 21 is then allowed to gel, and a fourth layer 23 of resinous mixture is spread over the third layer 21 and the sheet of material 22 which is positioned substantially at the surface of the layer 21.

Figure 5:
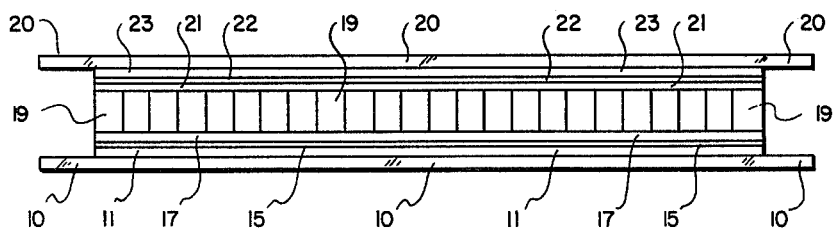
FIG. 5 is a diagramatic representation showing the application of a second mold base with its associated layers of resinous material to the top of the core element of the panel of FIG. 4.

Before any significant gelling of the fourth layer 23 of resinous material occurs the second mold base 20 is positioned so that the layer 23 contacts the other side of the core element 19. As shown in FIG. 5, the second mold base 20 is inverted and positioned over the core element 19. Alternatively, the first mold base 10 having the core element 19 already bonded thereto could be inverted and placed over the uncured layers of resinous mixture on mold base 20. In either circumstance, sufficient force is developed between the second mold base 20 and the core element 19 so that the side of the core element 19 penetrates substantially the depth of the fourth layer 23 of resinous mixture on mold base 20, whereby the side of the core element 19 is positioned substantially adjacent to the sheet of material 22 at the surface of the third layer 21 on mold base 20. The third and fourth layers 21 and 23, respectively, are then cured to a hardened, rigid, solid state.

As mentioned above, preferably the curing of the panel is done in one step with layers 11, 17, 21, and 23 all being cured together. Advantageously, the curing is facilitated by heating the mold base or bases and composite panel board formed thereon. As the mold bases and associated panel are heated, the resinous binder in the layers 11, 17, 21 and 23 of resinous mixture cures and undergoes shrinkage as a result of the heating and curing. The mold bases 10 and 20, of course, do not shrink as they are being heated, but rather expand at least to some extent. The differential reduction in size of the surfaces of the panel with respect to the mold bases creates stress between the panels and the mold bases which facilitates separation of the panels from the mold bases. The differential reduction can be further enhanced by cooling the combined panel and mold bases following the curing step. As the panel and mold bases cool, the panel tends to undergo a greater reduction in size than do the mold bases. Preferably, the heating and cooling are achieved by forced air methods in which a uniform flow of heated air and of cooled air, respectively, flows over and under the panel and mold bases. Such forced air heating and cooling results in substantially uniform heating and cooling, which promote uniform shrinkage differentials over the opposite faces of the panel, thereby enhancing uniform separation of the panel from the mold bases. In practice, the separation of the panels and the mold bases are achieved following the cooling of the cured panels by initiating the separation at the side edges of the panels and mold bases with a chiseling action along the edges between the interface of the panels and the mold bases. When the panels and mold bases have been heated and cooled as described above, the separation of the panels from their corresponding base molds propagates readily from the chiseling action at the edges of the panels throughout the faces of the panels.

In a preferred embodiment of the invention, means are provided for vibrating the doctor blades which are used to spread the different layers of resinous mixture on the mold base. The vibration of the doctor blades permits rapid, uniform formation of the layers of resinous mixture. In addition, the vibration of the doctor blade produces rapid migration of air bubbles in the resinous mixture to the surface as the layer is being spread, thereby substantially eliminating air bubbles from such layer.

The sheets of material 15 and 22 which are interposed between layers 11 and 17 and layers 21 and 23, respectively, may consist of a material which is capable of absorbing some of the liquid binder in the resinous mixture, or a material which is permeable to the resinous mixture, or a material which is both permeable to the resinous mixture and capable of absorbing some of the liquid binder in the resinous mixture. Examples of suitable materials include paper, net or open celled structures of metal or plastics, and fiber and gauze mats. Preferably, the sheets of material 15 and 22 comprise fiber glass, either in the form of woven cloth or as a non-woven mat.

The liquid resinous binder component of the resinous mixture can be any liquid polymer system capable of being cured to a rigid, solid state. Preferably, the liquid resinous binder is an isophthalic, phthalic, bisphenolic, or other polyester containing a curing agent such as, for instance, hexamethylenetetramine. Other examples of polymers useful as the liquid resinous binder of this invention include polyvinyl chlorides, polyvinyl acetates, polyethers, polyurethanes, polyethylenes, phenol formaldehydes, and synthetic resins of the epoxy type.

The solid particles used in the resinous mixture comprise sand, stone powder, stone crush, granular slag, metal powder, and mixtures thereof. Preferably, the solid particles have an average grain size of about 0.15 mm.

Although the invention has been described in detail with respect to particular embodiments thereof, it will be understood by those of ordinary skill in the art that variations and modifications may be effected without departing from the subject matter coming within the scope of the following claims, which subject matter is regarded as the invention.

We claim:

1. A method of manufacturing flat, sandwich-type, composite panels comprising the steps of spreading a first layer of a mixture of solid particles and liquid resinous binder on a polished, mold base; applying a sheet of material which can be permeated by the mixture of particles and resinous binder on the surface of said first layer; allowing the resinous binder in said first layer to gel; spreading a second layer of said mixture of solid particles and liquid resinous binder over said first layer and the sheet of material which is positioned substantially at the surface of said first layer; applying one side of a core element to the surface of said second layer, said core element being made of a material having an open-cell form or, otherwise, being permeable to the resinous binder and solid particles of said second layer; penetrating said second layer with said one side of said core element, so that said one side of said core element is adjacent to the sheet of material at the surface of said first layer; and allowing both said first and second layers to cure to a hardened, rigid, solid state.

2. A method of manufacturing composite panel in accordance with claim 1, wherein a substantially flat glass panel is glued to a metallic frame with one of the broad surfaces of said glass panel being polished and exposed as the face of the mold base; and the exposed face of the mold base is treated with a release agent prior to the step of spreading the first layer of said mixture of solid particles and liquid resinous binder on said mold base.

3. A method of manufacturing composite panels in accordance with claim 2, wherein the glass panel is glued to the metallic frame using a silicone rubber adhesive.

4. A method of manufacturing composite panels in accordance with claim 1, wherein a color coat of a resinous material is spread on the mold base prior to the application of the first layer of the mixture of solid particles and liquid resinous binder.

5. A method of manufacturing composite panels in accordance with claim 4, wherein the color coat comprises a polyester base paint.

6. A method of manufacturing composite panels in accordance with claim 1, wherein a color pigment is also included in the mixture of solid particles and liquid resinous binder.

7. A method of manufacturing composite panels in accordance with claim 1, wherein the first and second layers of the mixture of solid particles and liquid resinous binder is spread substantially evenly on the mold base and first layer, respectively, by a vibrating doctor blade which extends across the width of the mold base in spaced, substantially, parallel relationship thereto, and which traverses the length of the mold base.

8. A method of manufacturing composite panels in accordance with claim 1, wherein following the application of the core element to the second layer of said particles and resinous binder, the composite panel is heated to cure the resinous binder and cause shrinkage of the first and second layers of solid particles and resinous binder, thereby facilitating separation of the composite panel from the mold base, the latter of which does not undergo shrinkage as the panel and mold base are being heated.

9. A method of manufacturing composite panels in accordance with claim 8, wherein the heating is accomplished by directing heated air into contact with the mold base.

10. A method of manufacturing composite panels in accordance with claim 1, including the additional steps of: spreading a third layer of the mixture of solid particles and liquid resinous binder on a second, polished, mold base; applying a second sheet of material which is permeable to the mixture of solid particles and liquid resinous binder on the surface of said third layer; allowing the binder in said third layer to gel; spreading a fourth layer of said mixture of solid particles and liquid resinous binder over said third layer and said second sheet of material which is positioned substantially at the surface of said third layer; positioning the second mold base so that the fourth layer of said mixture of solid particles and resinous binder contacts the other side of the core element, with said other side of the core element penetrating said fourth layer to the second sheet of material at the surface of said third layer; and allowing both said third and fourth layers to cure to a hardened, rigid, solid state.

11. A method of manufacturing composite panels in accordance with claim 10, wherein the first and second layers of mixture of particles and resinous binder is cured to a hardened, rigid, solid state prior to the positioning of the second mold base so that the fourth layer of said mixture is in contact with the other side of the core element.

12. A method of manufacturing composite panels in accordance with claim 10, wherein the second mold base is positioned so that fourth layer of said mixture is in contact with the other side of the core element prior to the curing of the first and second layers of said mixture, and allowing the first, second, third, and fourth layers of said mixture to cure simultaneously.

* * * * *